United States Patent [19]

Wright et al.

[11] Patent Number: 4,463,501
[45] Date of Patent: Aug. 7, 1984

[54] LEVEL CONSTRUCTION AND METHODS OF CONSTRUCTING A LEVEL

[75] Inventors: Randall J. Wright, Brookfield; Gary T. Macklin, Oconomowoc, both of Wis.

[73] Assignee: Empire Level Mfg. Corp., Milwaukee, Wis.

[21] Appl. No.: 430,790

[22] Filed: Sep. 30, 1982

Related U.S. Application Data

[63] Continuation-in-part of Ser. No. 342,599, Jan. 25, 1982, abandoned, which is a continuation of Ser. No. 109,758, Jan. 7, 1980, abandoned.

[51] Int. Cl.$^3$ .................. G01C 9/08; G01C 17/18
[52] U.S. Cl. ........................................ 33/350; 33/379
[58] Field of Search .......... 33/347, 350, 376, 379–383; 29/453; 403/13, 14; D10/69

[56] References Cited

U.S. PATENT DOCUMENTS

| | | | |
|---|---|---|---|
| 1,690,053 | 10/1928 | Charlton | 33/381 |
| 1,777,429 | 10/1930 | Charlton | 33/381 |
| 2,103,743 | 12/1937 | Doty | 29/453 |
| 2,716,804 | 6/1955 | Johnson | 29/453 |
| 3,191,727 | 6/1965 | Schmeltz | 29/453 |

FOREIGN PATENT DOCUMENTS

| | | | |
|---|---|---|---|
| 667536 | 1/1965 | Belgium | 33/379 |
| 639437 | 6/1950 | United Kingdom | 33/381 |

*Primary Examiner*—Charles E. Phillips
*Attorney, Agent, or Firm*—McDougall, Hersh & Scott

[57] ABSTRACT

A level instrument for determining angular relationships includes a frame having a rail section defining a working surface, a vial, and an end plate affixed to the frame. The end plate has a plastic body with integral lip, shoulder and stake or pawl elements. The frame includes passages which receive the stake or pawl elements to permanently interconnect the end plate and frame. Indexing elements automatically orient a shoulder and an edge of the end plate adjacent to the rail section defining the working surface to prevent false level readings occasioned by displacement. A method for constructing the level of the invention which includes affixing the end plate to the frame, displacing a portion of the lip overlaying the frame passage into the passage, to permanently anchor the end plate to the frame. A second method for constructing the level of the invention wherein the end plate is urged axially onto the frame end until flexible pawls extending from the end plate engage recesses in the frame passages permanently anchoring the end plate to the frame.

7 Claims, 13 Drawing Figures

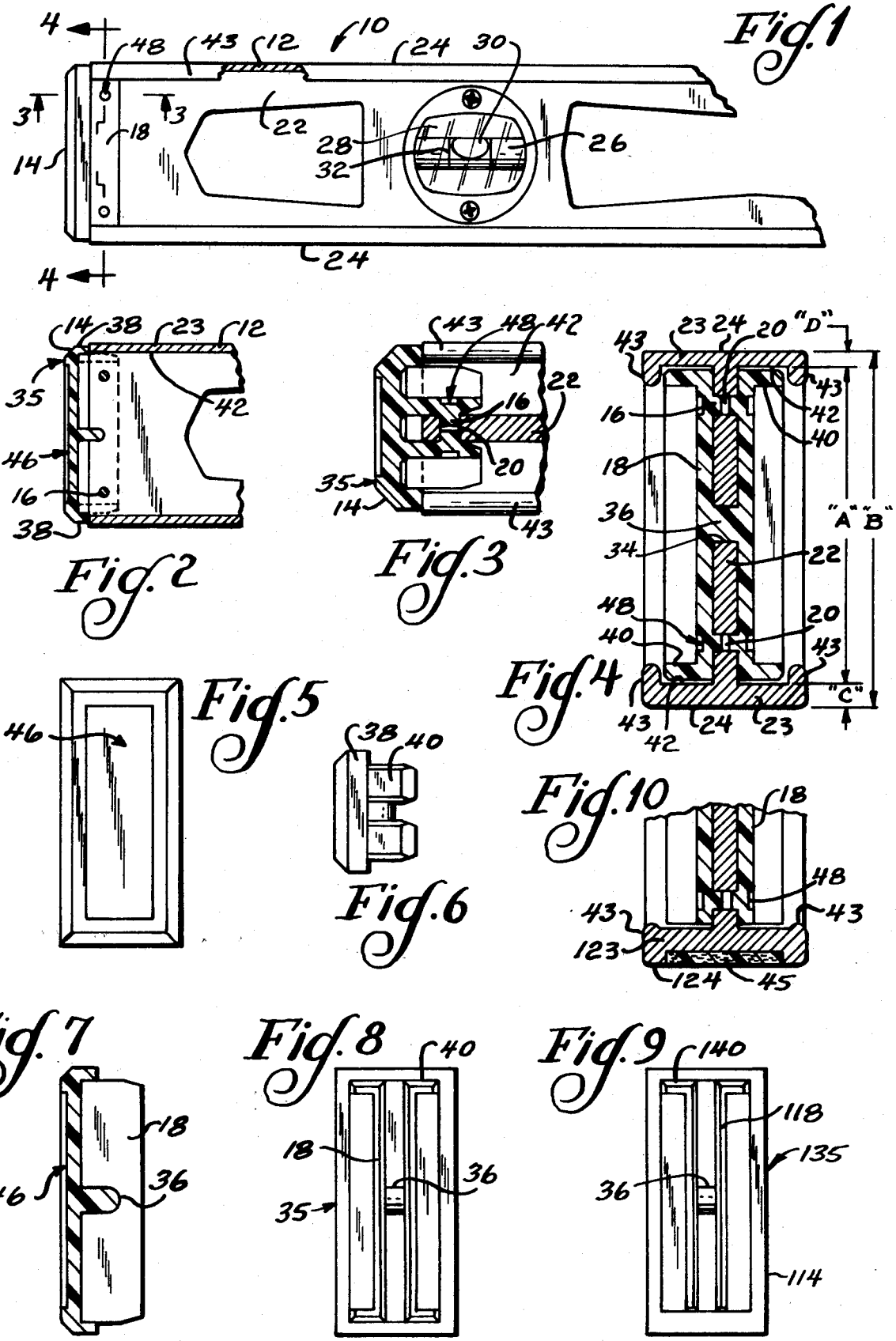

LEVEL CONSTRUCTION AND METHODS OF CONSTRUCTING A LEVEL

This is a continuation-in-part application of application Ser. No. 06/342,599, filed on Jan. 25, 1982 which is a continuation application of application Ser. No. 06/109,758, filed on Jan. 7, 1980, both now abandoned.

BACKGROUND OF THE INVENTION

This invention relates to level measuring devices which shall provide consistently accurate service over an extended useful life. The invention also relates to methods of producing such levels by affixing resilient end plates to level frames.

Of paramount importance in the level trade, and particularly levels produced for carpenters, is the need for the provision of level devices which are both durable and consistently accurate and which can be sold at competitive prices. The level of the invention fulfills each of these trade needs.

As a result of both the high manufacturing cost involved in the production of metal end fixtures for level instruments and field problems experienced with inaccuracies caused by end fixture damage, numerous attempts have been made to develop the use of materials other than metal end plate fixtures. Since the preponderance of level instruments being produced at this time incorporate extruded aluminum frames, the use of dissimilar materials, such as plastic, have given rise to a number of manufacturing problems. Permanent securement of plastic end fixtures to metal frames has been troublesome. Orientation of the edges of end fixtures to extruded metal frames has been particularly troublesome. Because of the widely varying cross-sectional dimensions encountered in the use of extruded level frames, it has been difficult to secure plastic end fixtures to the frame in a manner such that at least a portion of the end fixture will not intersect one or more of the level working surfaces provided by the frame. This will produce inaccuracy in level measurements made with reference to the affected working surfaces.

Applicants have addressed themselves to these problems and overcome them with the level instrument of the invention. The end plate of this level is fabricated from a thermoplastic material, and can be permanently anchored to an extruded metal frame structure and is automatically oriented to the frame to accommodate variations in cross-section of the frame extrusion without intersecting or overlapping working surfaces. This has obviated instrument inaccuracies and the need for additional machining operations to remove such overlaps or intersections. The resulting unit can thereby utilize the benefits of a resilient material, such as plastic, in level instruments. The instrument may be dropped on end and subjected to a reasonable amount of rough handling without imparting permanent damage to the instrument, as has often resulted from the burring or upsetting of end edges in metal end fixtures in such a way as to intersect or overlap working surfaces. In such instances, the metal end fixtures, once damaged, often destroyed or impaired the utility of the instrument. However, with the level of the invention, minor damage to the plastic end plate through rough handling will rarely affect the instrument's life or accuracy.

THE PRIOR ART

Many prior art levels include extruded metal frames. However, because of the dimensional inaccuracies inherent in the level frame extrusion process, the frames are typically broached and machined before mating with the end plates. This ultimately resulted in levels with varying cross-sectional dimension. Particularly troublesome was the fact that the thickness of the rail portions which defined the working surfaces of the finished products varied substantially. Due to tolerance variations in the extrusions and associated machining of working surfaces, an end plate indexed to the rail portions of the frame would frequently be displaced from the actual longitudinal center line of the level. As a result, one of the portions of the end plate overlaying the rails would invariably intersect and project beyond a working surface of the level. Unless an additional machining operation was employed to remove the overlap, one working surface of the level would remain inaccurate. The present invention solves this problem and obviates the costly and conventional remachining, i.e. milling of the assembled level and end plate combination.

SUMMARY OF THE INVENTION

The invention includes a level instrument which is designed to detect angular deviation and be consistently accurate, durable and available at competitive prices. The level frame is constructed of a structurally stable and durable material. The frame includes a web and an integral pair of opposed rails which generally define an "I" in cross-section. The rails provide a pair of opposed working surfaces and one or more bubble vials affixed to the web. The plastic end plates are molded to include indexing and structural reinforcement elements. The frame includes indexing elements on the web which are mateable with the end plates in a manner that assured that the edges of the end plates will not overlap either working surface. The indexing elements on the web orient the end plate reinforcement elements relative to the pre-machined rails in a manner assuring that the end plate cannot be pivoted or rolled after mounting on the frame. These features of the present invention achieve the objectives of accuracy, durability and reduced cost.

The invention also encompasses a method of constructing a level which automatically orients the end plate by affixing plastic end plates to the level frame relative to the frame to obviate any working surface overlap by the end plate. The web ends of the frame are provided with one or more passages and an indexing element. The end plates are provided with mating elements reacting with the web indexing element and with lips that cover the web passages. The end plate and frame are automatically oriented by respective indexing elements.

In one embodiment of this invention, segments of the lip portions are displaced into the web passages after end plate orientation to form stakes. The lips and stake portions thereof within the passages rigidly anchor the end plates to the frame ends in the automatically oriented position. According to another embodiment, flexible pawls having retention teeth thereon are urged into channels in the frame until the pawl teeth engage channel retention surfaces thereby rigidly anchoring end plates to the frame ends.

BRIEF DESCRIPTION OF THE DRAWINGS

For a more complete understanding of the invention, reference is made to the drawings, in which:

FIG. 1 is a fragmented side elevation of a level device according to the present invention;

FIG. 2 is a fragmented side elevation view of an end of the invention of FIG. 1;

FIG. 3 is a sectional view of the invention of FIG. 1 taken along line 3—3;

FIG. 4 is a sectional view of the invention of FIG. 1 taken along line 4—4, and illustrating an asymmetric rail cross-section;

FIG. 5 is an elevational plan view of an end plate used in the invention of FIG. 1;

FIG. 6 is a plan view of an edge of the end plate of FIG. 5;

FIG. 7 is a sectional view of the end plate of FIG. 8 taken along line 7—7;

FIG. 8 is an elevational plan view of a first embodiment of the end plate of FIG. 5;

FIG. 9 is an elevational plan view of a second embodiment of the end plate of FIG. 5;

FIG. 10 is a partial view of a second embodiment of the level of FIG. 4 utilizing the end plate of FIG. 9;

DESCRIPTION OF THE PREFERRED EMBODIMENT

Figure 11:
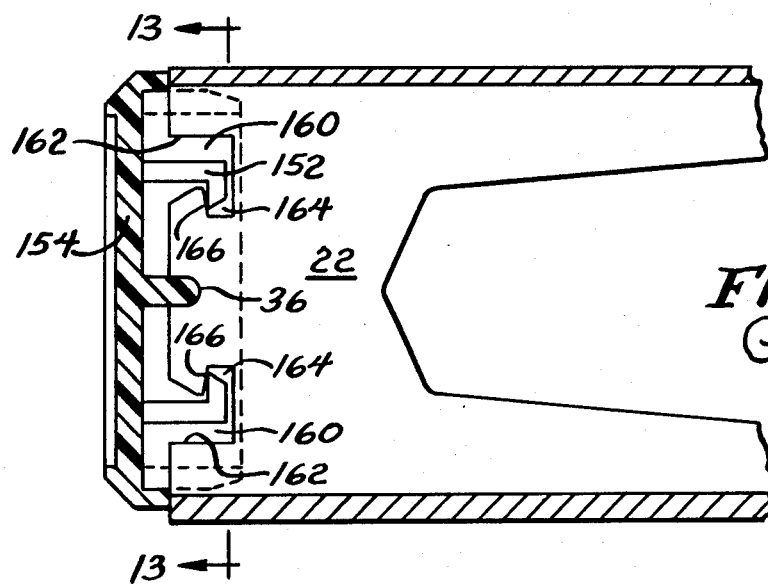
FIG. 11 is a fragmented side elevation view of the end of a level instrument employing the alternative pawl-type end plate retention of this invention.

Referring to the drawings, Description of the Preferred Embodiment, FIG. 1 shows a level measuring device according to one embodiment of the present invention generally designated by the reference numberal 10. A frame 12 and a plastic end plate 14 are securely interconnected by stakes 16 (FIGS. 2, 3 and 4) which project from lips 18 of the end plate 14 and extend into holes 20 blanked through web 22 of the frame 12.

To better illustrate one of the problems solved by the invention, FIG. 4 illustrates in cross-section the typically asymmetric "I" configuration of an extruded frame of the invention. In the extrusion of frame stock, surface irregularities are common. Because of these surface irregularities, the outermost surfaces of opposed rail 23 must be precision milled to provide the planar working surface 24 of a completed level instrument.

The combination of extrusion irregularity of frame stock and precision milling of working surfaces will typically produce a dimensionally asymmetric level frame of the type illustrated in FIG. 4. While the dimension "A" across the web 22 generally remains the same throughout frame manufacture, in the prior art, it served as alignment or orientation means for end plates. The dimension "B" may vary in manufacture. As a result, the lower rail of the frame illustrated in FIG. 4 has a greater thickness "C" than the thickness "D" of the upper rail. While in rare instances, the rails of the completed frame may be virtually symmetrical, one or the other of the rails 23 will typically be thicker than the other.

From this, one can appreciate that a close-fitting and aesthetically clean end plate of the type illustrated in the drawings and having lips 18 designed to fit tightly across dimension "A" of the web will routinely have an edge which shall intersect the working surface 24 and project beyond it. When this occurs, the intersected working surface will be inaccurate and remain so unless the frame is subjected to a conventional post assembly milling or machining step to remove the projecting portion of the end plate. Obviously, additional manufacturing steps involving removal of thermoplastic material from adjacent a precision ground metal surface will add cost and complexity to level manufacture and the resultant end plate will tend to render the completed level instrument commercially unacceptable.

The planar working surfaces 24 define the gauging line or plane of the level. A horizontally disposed vial 26 and opposed cover glasses 28 (one shown in the drawings) are secured to the web 22. The vial 26 is arranged in the web 22 so that a bubble 30 contained by the vial will align itself between a pair of indicator markings 32 on the vial 26 at a pre-selected angle. The web 22 includes an indexing notch 34 (FIG. 4) which ideally is centered precisely on the axis of the horizontal vial 26 and parallel to the working surface 24.

The end plate 14 has a one-piece molded body 35 with an indexing ridge 36 (FIGS. 2, 4, 7, 8 and 9) which interconnects and is disposed normally to the planes of the lips 18. Insertion of the ridge 36 into the indexing notch 34 automatically and precisely orients or aligns the ridge 36 with the axis of the vials and frame of the completed level instrument. Automatic and accurate mating of ridge 36 with notch 34 alone serves to position each of the pair of end plate edges 38 independent of cross-sectional variations of the frame dimensions. The level is constructed so that the distance from the mated indexing notch 34 and ridge 36 to the edges 38 of the end plate will always be at least slightly less than the distance from the mated elements to either working surface 24. This will produce the esthetically attractive, close fitting end plate assembly illustrated in FIG. 1 while obviating potential end plate overlap.

As can be best seen in FIG. 6, each end plate 14 also includes opposed shoulders 40 which project from, and are disposed normally to the plane of the lips 18. The shoulders 40 are contained by a channel defined by the underside 42 of the rails 23 and projecting skirts 43. The interaction of the shoulders 42 within these channels will prevent rolling and pivoting of the end plate 14 on the frame 12. Thus, the stakes 16 cannot be easily broken or displaced from the passages 20.

In a second embodiment of the lvel (FIG. 10), the lower rail 123 is intentionally of an increased dimension to accommodate the insertion of an elongated magnetic element 45 in a groove in working surface 124. The end plate 114 of FIG. 9 is especially constructed for use in this embodiment and includes shortened lips 118 and shoulders 140 adjacent only one end.

The end plate 14 is also provided with a recess (generally designated by the reference numeral 46 and best viewed in FIG. 5) in the end of the body 35. The recess 46 receives a name plate (not shown in the drawings) or other product identifying indicia.

Once the frame 12 has been constructed and the end plate 14 molded, the end plate 14 is loaded upon the frame 12 as described. A portion of the lips 18 are displaced into the passage 20 (near the area generally designated by the reference numeral 48 in FIGS. 1, 3 and 4). The plastic is displaced into the passages 20 a sufficient distance to form the stakes 16 and lock the end plate 14 to the frame 12. This is ordinarily done by cold flowing the plastic. The lips 18 are newly formed stakes 16 rigidly anchor the end plate to the frame in the automatically oriented position produced by the indexing element.

Figure 12:
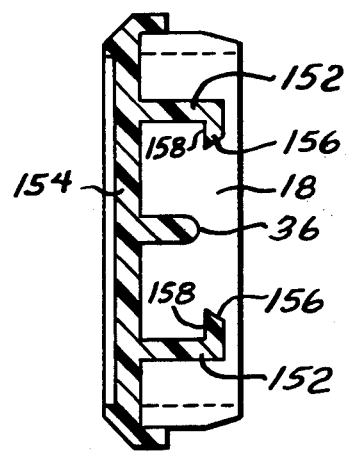
FIG. 12 is a sectional view of the end plate utilizing the alternative pawl retention of this invention.
Figure 13:
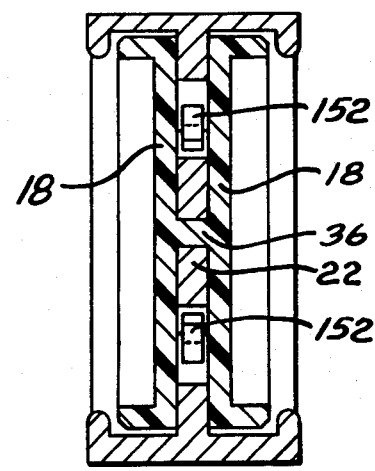
FIG. 13 is a sectional view of the invention shown in FIG. 11 taken along line 13—13.

FIGS. 11, 12 and 13 illustrate an alternative structure for attaching the end plate to the level frame. Advantageously, this embodiment requires no additional installation or fabrication steps once the end plate has been properly positioned. The end plate is simply urged onto the level frame until it automatically and rigidly engages the end of the level frame.

The end plate of this embodiment includes integrally molded resilient pawl structures 152 extending from the inside surface of cover body 154 between lips 18. Locking teeth 156 having frame engaging surfaces 158 are provided on the end of these pawls structures which, because of their resiliency will flex, as required, during installation of the end plate.

A pair of generally "L"-shaped pawl receiving apertures 160 are provided in the end of web 22 and include entry channels 162 and teeth locking slots 164. The narrowest width of entry channels 162 is sufficient to permit the unobstructed passage of the teeth 156 on the flexed or expanded pawl structure 152 during end plate installation. The web locking slots 164 include teeth engaging surfaces 166 spaced from the end of the frame to rigidly anchor the end plate to the frame. To assure a secure fit between the end plate and frame, engaging surfaces 166 may be provided with a sloping face relative to the end of the frame as shown in FIG. 11. Alternatively, surface 158 of teeth 156 may be sloped. In this manner pawl structures 152 can pivot increasingly into recesses 164 as required to anchor the coverplate firmly against the level frame end.

The pawl structures 152 and corresponding "L"-shaped apertures 160 are in facing relationship in order that the resilient biasing forces acting upon the pawl structures during installation will be opposed and counteracting. Outwardly facing pawls and slots would similarly produce the desired counteracting force relationship.

The end plate is installed by urging pawl structures 152 into respective entry channels 162 until the teeth 156 enter locking slots 164 thereby firmly anchoring the end plate and the indexing ridge 36 thereof to the end of the web of the level frame. The respective spacing between pawl structures 152 and apertures 160 forces teeth 156 to rotate or expand outwardly as the teeth initially enter channels 162. Due to the resilient nature of the plastic end plate material comprising the pawls, the pawls are thereby resiliently biased inwardly toward each other. As teeth 156 enter slots 164, the biased pawls rotate inwardly urging the teeth 156 into anchoring engagement against surfaces 166. Due to the sloping contour of surfaces 166, the resilient biasing of the pawl structures necessarily draws the cover plate axially into tighter engagement with the end of level web 22. Pawl structures 152 continue to rotate inwardly in a resilient return to their normal unbiased positions until no further axial movement of the end plate is possible. In this manner the end plate of this invention is automatically and rigidly anchored to the level frame without adjustment nor additional installation steps. In addition, it can appreciated that the end plate automatically compensates for manufacturing tolerances providing rigid plate-to-frame mounting in all cases without end plate intersecting with frame working surface.

It is contemplated that indexing ridge 36 will generally be utilized to properly align and strengthen the end plate whether the staked end plate retention shown in FIGS. 1-4 or the pawl retention of FIGS. 11-13 is employed. Pawl structures 152, however, may be enlarged. In such instance, the pawl structures, alone, will function to properly index the end plate within the center of the frame web in the absence of a ridge 36 while avoiding end plate overlap of working surfaces.

We claim:

1. A level instrument comprising an elongated frame which includes a web which interconnects opposed rails that define opposed working surfaces; indexing means comprising an automatic alignment notch formed in an end of the web which is disposed in predetermined alignment with the axis of a vial mounted relative to the web; a plastic end plate formed with coacting indexing means mateable with the indexing means on the frame and with end plate edges spaced from the coacting indexing means whereby securement of the plastic end plate to the frame end provides automatic orientation between the plastic end plate and the frame end in a manner obviating intersection of any edge of the plastic end plate with the plane of the working surface.

2. A level instrument comprising an elongated integral frame which includes a web which interconnects opposed rails that define opposed working surfaces; indexing means comprising an automatic alignment notch formed in an end of the web which is disposed in predetermined alignment with the axis of a vial mounted relative to the web; a plastic end plate formed with coacting indexing means mateable with the indexing means on the frame wherein the end plate coacting indexing means comprises a ridge which is insertable in the notch and automatically establishes precise predetermined relationship with the alignment notch and with end plate edges spaced from the coacting indexing means whereby securement of the plastic end plate to the frame end provides automatic orientation between the plastic end plate and the frame end in a manner obviating intersection of any edge of the plastic end plate with the plane of the working surface.

3. A level instrument comprising an elongated frame having a working surface defining a plane; a vial secured to the frame and disposed in a preselected angular relationship with the plane of the working surface; an end of the frame having indexing means thereon aligned in a predetermined angular relationship with respect to the plane of the working surface and the vial; a plastic end plate formed with coacting indexing means mateable with the indexing means on the frame wherein end plate edges are spaced from the coacting indexing means and including a lip disposed adjacent the coacting indexing means and overlying a portion of the frame wherein the frame portion which the lip overlies includes a passage and the lip includes an integral stake element which is inserted into the passage to anchor the end plate to the frame in automatic orientation obviating intersection of any edge of the plastic end plate with the plane of the working surface.

4. The level of claim 3 wherein the lip includes a shoulder portion for preventing the lip from displacing the stake from the passage.

5. The level of claim 4 wherein the frame includes a web which interconnects rails and depending skirts which form an elongated channel with the web; and the shoulder portion is contained within the channel and to prevent deflection of the end plate relative to the frame.

6. A level instrument comprising an elongated integral frame having a planar working surface and an opposed surface spaced from the working surface by a web; a vial secured to the web and disposed in a preselected angular relationship with the planar working surface; an end of the web having indexing means thereon aligned in predetermined relationship to the axis of the elongated frame; a plastic end plate extending axially beyond the end of the frame and the end plate formed with co-acting indexing means mateable with the indexing means on the web and with end plate edges spaced from the co-acting indexing means whereby securement of the plastic end plate and the web end provides automatic orientation between the plastic end plate and the frame end in a manner obviating intersection of any edge of the plastic end plate with the planar working surface, the plastic end plate is formed with integral anchoring means disposed in operative relationship with the co-acting indexing means thereof and means on the web for receipt of the integral anchoring means whereby the end plate may be anchored to the frame of the level instrument in orientation obviating intersection of any edge of the plastic end plate with the plane of the working surface, the means on the web for receipt of the integral anchoring means includes an aperture and the integral anchoring means includes pawl means insertable into the aperture to anchor the end plate to the frame in automatic orientation obviating intersection of any edge of the plastic and plate with the plane of the working surface, the pawl means include spaced complementary pawls having web-engaging teeth thereon and wherein the aperture includes spaced complementary inlets having teeth engaging recesses therein, the spacing between complementary pawls is selected such that respective pawl teeth interferingly contact the web aperture upon end plate installation thereby forcing opposed pivotal rotation of the complementary pawls and biasing the pawls against the teeth engaging recesses within the apertures, the teeth engaging recesses include surfaces disposed at acute angles relative to the paths described by the pawl teeth during limited pivotal rotation and in such further angular relationship that the pivotal rotation of the pawls in response to the biasing forces cause the pawls and end plate to move axially into tighter engagement with the level frame.

7. The level of claim 6 wherein the teeth include recess engaging surfaces disposed at acute angles relative to the paths described by the pawl teeth during limited pivotal rotation and in such further angular relationship that the pivotal rotation of the pawls in response to the biasing forces cause the pawls and the end plate to move axially into tighter engagement with the level frame.

* * * * *